US009697144B1

(12) United States Patent
Chen et al.

(10) Patent No.: US 9,697,144 B1
(45) Date of Patent: Jul. 4, 2017

(54) QUALITY OF SERVICE ENFORCEMENT AND DATA SECURITY FOR CONTAINERS ACCESSING STORAGE

(71) Applicant: Red Hat, Inc., Raleigh, NC (US)

(72) Inventors: Huamin Chen, Westboro, MA (US); Feiran Zheng, Beijing (CZ); Stephen James Watt, Cedar Park, TX (US); Andrew Grover, Portland, OR (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/244,742

(22) Filed: Aug. 23, 2016

(51) Int. Cl.
G06F 9/455 (2006.01)
G06F 13/10 (2006.01)

(52) U.S. Cl.
CPC ............ G06F 13/105 (2013.01); G06F 9/455 (2013.01)

(58) Field of Classification Search
CPC ................................ G06F 13/105; G06F 9/455
USPC .......................................................... 703/25
See application file for complete search history.

(56) References Cited

U.S. PATENT DOCUMENTS

| 8,793,688 B1 | 7/2014 | Mustacchi et al. | |
| 9,201,704 B2 | 12/2015 | Chang et al. | |
| 2006/0004709 A1* | 1/2006 | Borthakur | G06F 17/30067 |
| 2012/0185913 A1* | 7/2012 | Martinez | G06F 9/455 |
| | | | 726/1 |
| 2013/0268643 A1* | 10/2013 | Chang | G06F 9/45558 |
| | | | 709/223 |
| 2014/0007222 A1* | 1/2014 | Qureshi | G06F 21/10 |
| | | | 726/16 |
| 2015/0058382 A1* | 2/2015 | St. Laurent | G06F 17/30076 |
| | | | 707/823 |
| 2015/0143368 A1 | 5/2015 | Bugenhagen | |
| 2015/0263983 A1 | 9/2015 | Brennan et al. | |
| 2015/0324236 A1 | 11/2015 | Gopalan et al. | |

OTHER PUBLICATIONS

Anonymous. Creating Multi-Container Pods. Kubernetes.io, Jun. 2016, http://kubernetes.io/docs/user-guide/pods/multi-container/. Accessed Jun. 1, 2016. 5 pages.
Anonymous. SUSE Linux Enterprise Server 12 SP1 Virtualization Guide. SUSE, Feb. 18, 2016, https://www.suse.com/documentation/sles-12/singlehtml/book_virt/book_virt.html. Accessed Jun. 1, 2016. 387 pages.
Shah, Amit. Live Migrating QEMU-KVM Virtual Machines. Red Hat, Mar. 24, 2015, http://developers.redhat.com/blog/2015/03/24/live-migratingqemu-kvm-virtual-machines/. Accessed Jun. 1, 2016. 20 pages.

(Continued)

*Primary Examiner* — Dwin M Craig
(74) *Attorney, Agent, or Firm* — Lowenstein Sandler LLP

(57) ABSTRACT

A processing device is to receive a block input/output (I/O) call in a first format from a container hosted on a host machine to request data on a storage device and translate the block I/O call from the first format into a device emulator call in a second format. The second format is compatible with a device emulator on the host machine. The device emulator emulates a block storage device for the container. The processing device is to send the device emulator call in the second format to the device emulator, and receive, from the device emulator, a response that include the data on the storage device for the container.

20 Claims, 5 Drawing Sheets

(56) References Cited

OTHER PUBLICATIONS

Gerlach, Wolfgang et al. "Skyport—Container-Based Execution Environment Management for Multi-Cloud Scientific Workflows" DataCloud, 2014. pp. 1-8. 8 pages.
Jones, M. Tim. Managing VMs with the Virtual Machine Manager. IBM, Oct. 31, 2012. https://www.ibm.com/developerworks/cloud/library/clmanagingvms/. Accessed Jun. 1, 2016. 9 pages.

* cited by examiner

QUALITY OF SERVICE ENFORCEMENT AND DATA SECURITY FOR CONTAINERS ACCESSING STORAGE

TECHNICAL FIELD

The present disclosure relates to containers accessing storage, and more particularly, to Quality of Service (QoS) enforcement and data security for containers accessing storage.

BACKGROUND

Cloud computing services can provide information technology (IT) as a service over the Internet or dedicated network, with delivery on demand. Cloud computing services can range from full applications and development platforms, to servers, storage, and virtual desktops. Corporate and government entities can utilize cloud computing services to address a variety of application and infrastructure needs. Platform-as-a-Service (PaaS) is a category of cloud computing services that provides a platform to allow consumers to develop, run, and manage applications without the complexity of building and maintaining the infrastructure.

Cloud computing utilizes server and storage virtualization to allocate/reallocate resources rapidly. The resources can include virtual resources, such as virtual machines and containers. The containers and virtual machines in the cloud can access and share storage devices in the cloud. The storage devices can include a file system for organizing data on the storage devices. Generally, when a container is provisioned on a host in a cloud, the container mounts the file system, which typically gives the container access to the contents of the entire file system. Generally, virtual machines are provisioned in the cloud via a hypervisor and a device emulator, and have a data input/output (I/O) path that accesses the storage device via the device emulator.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
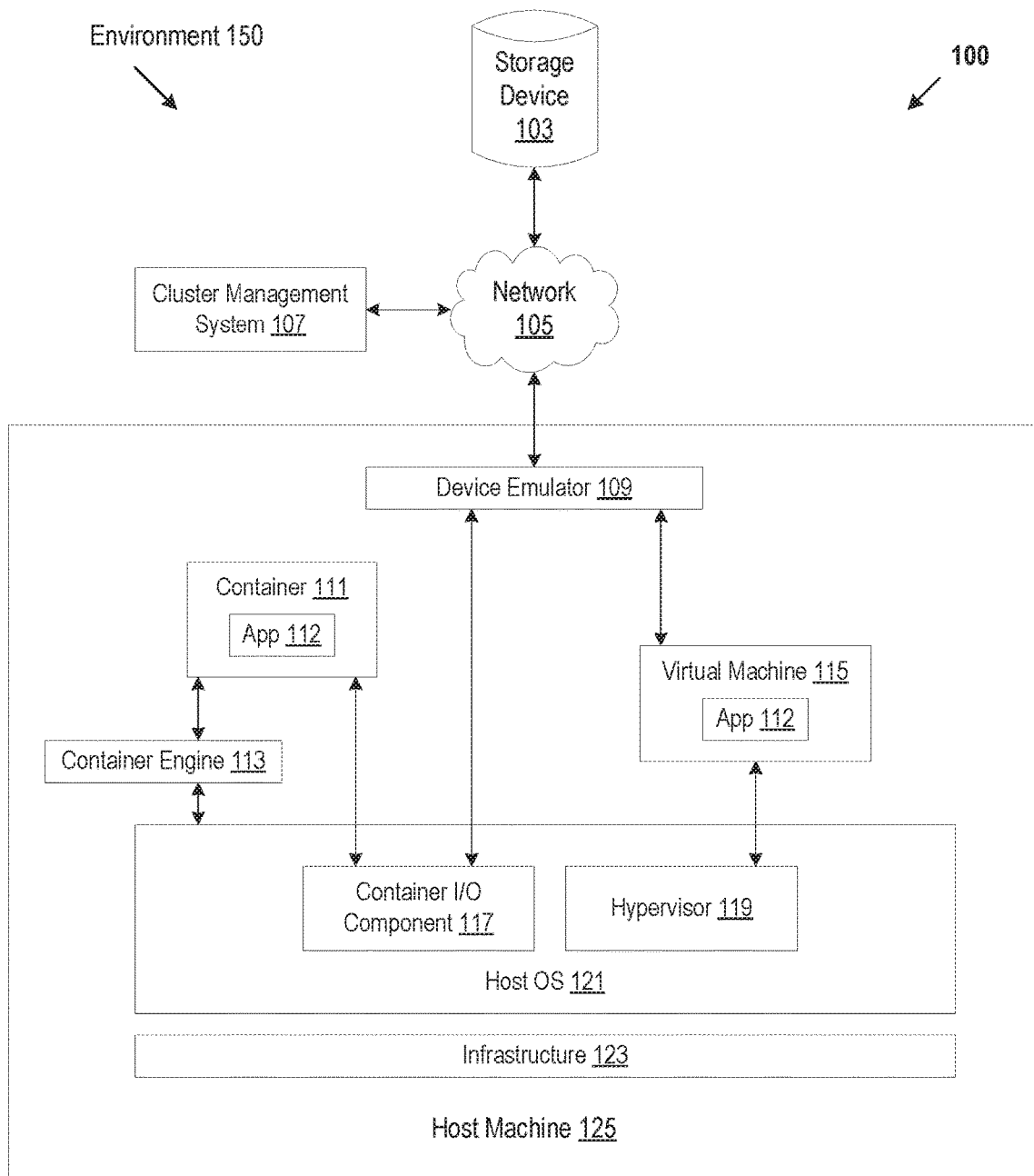
FIG. 1 is an example system architecture in which implementations of the present disclosure can be implemented.

Aspects and implementations of the present disclosure enforce Quality of Service (QoS) and data security for containers accessing storage. In a cloud environment or big data environment, there can be one or more host machines to host multiple virtual resources. The virtual resources can be containers and/or virtual machines. A container can refer to an isolated set of resources allocated to executing an application and/or process independent from other applications and/or processes. A virtual machine can be a software implementation of a machine (computer) that includes its own operating system (referred to as a guest operating system) and executes application programs.

The containers and/or virtual machines can share backend storage devices. The storage devices can include a file system for organizing the data on the storage devices. Traditionally, the containers directly access the storage devices using a mount point to mount the file system, and the virtual machines indirectly access the storage devices using a device emulator, which creates two independent and separate types of data input/output (I/O) paths for storage access in conventional solutions.

The resource environment can include a cluster management system for automating deployment, scaling, and operations of applications across clusters of hosts in the environment. Traditionally, when an environment includes containers and virtual machines, the cluster management system can be overburdened to manage multiple types of data I/O paths (e.g., one type for the virtual machines to indirectly access a storage device via a device emulator, and another type for the containers to directly access the storage device via mount points). Conventional solutions, which include containers that access storage devices via mount points, can also cause a lack of secure data isolation and cause QoS problems for the environment. Generally, the mount points for the containers give the containers access to an entire file system on the storage device. Such exposure in conventional solutions limits the capability to isolate the data which the containers should not be accessing.

In conventional solutions, there is generally a lack of QoS enforcement because, although a device emulator can monitor the performance (e.g., I/O performance) of the virtual machines, the mount points usually do not support the monitoring of the performance (e.g., I/O performance) of the containers when the containers are sending I/O requests to the storage devices and receiving I/O responses from the storage devices.

Implementations of the present disclosure create a computing infrastructure in a host machine to enable the containers and the virtual machines to access the storage devices using the device emulator as a common interface to the storage devices. Implementations of the present disclosure prevent the containers from accessing the storage devices via mount points by creating data I/O paths for the containers to access the storage devices via the device emulator. Implementations of the present disclosure can enforce QoS policies by converging the data I/O paths of the various virtual resources (e.g., containers, virtual machines) to the device emulator as a single gateway to the storage devices. Implementations of the present disclosure can use the device emulator to monitor the performance across all of the containers and virtual machines.

With traditional storage solutions, the device emulator typically creates a hypervisor-encoded file to emulate a storage device for a virtual machine, and data from the hypervisor-encoded file can be processed by the virtual machine. Traditionally, a container does not have the capability to process the data from a hypervisor-encoded file. As a result, conventional storage solutions, generally do not allow the hypervisor-encoded files for the virtual machines to be shared with or accessed by containers. Implementations of the present disclosure add a container I/O component to the operating system of a host machine to extract data from the hypervisor-encoded file which can be processed by the container to allow any type of virtual resource (e.g., container, virtual machine) to utilize the data from a hypervisor-encoded file to provide end-users with flexibility in deciding whether to instantiate a container or a virtual machine to access the hypervisor-encoded file. The technology discussed herein may be advantageous because it enhances data security by creating a data I/O path for a container that can control which data the container can access and improves efficiency in storing data by allowing data in hypervisor-encoded files to be used by both containers and virtual machines.

FIG. 1 is an example system architecture 100 in which implementations of the present disclosure can be implemented. The system architecture 100 can include an environment 150 that can provide computing services and/or computing resources to entities (e.g., corporate and government entities). The environment 150 can be a cloud environment or a big data environment that provides computing services and resources. The computing services can range from full applications and development platforms, to servers, storage, and virtual desktops. Platform-as-a-Service (PaaS) is a category of computing services that provides a platform to allow consumers to develop, run, and manage applications (e.g., applications 112). The resources can include, for example, compute resources, storage resources, and network resources. The compute resources can include, and are not limited to, processing devices, host machines, software containers, virtual machines, applications, memory, hypervisors, etc. Storage resources can include, and are not limited to, storage servers, storage software, disks, data stores, etc. Network resources can include, and are not limited to, network interface cards, ports, routers, switches, internet protocol addresses, network domains, etc.

The resources and/or services can be allocated to and consumed by multiple tenants. A tenant can be an entity and/or sub-entity. An entity, as referred to herein, can represent any software provider, service provider, a business organization such as a corporation, an educational institution such as a college and university, etc. For example, several entities may be different Enterprise companies and may store and access different data sets in the environment 150. In another example, several sub-entities may be different departments within the same entity, such as an Enterprise company, and may store and access data in the environment 150.

An entity can utilize the environment 150 for application server virtualization using a software container (hereinafter referred to as "container") model and/or a virtual machine (VM) model. The environment 150 can include multiple host machines connected via one or more networks (e.g., network 105). For brevity and simplicity, one host machine 125 is illustrated in FIG. 1. A host machine 125 can host one or more virtual resources for virtualizing one or more application servers for executing one or more applications 112. The virtual resources can be containers (e.g., container 111), virtual machines (e.g., virtual machine 115), container(s) within a virtual machine, and/or virtual machine(s) within a container.

For brevity and simplicity, one container 111 and one virtual machine 115 being hosted on the host machine 125 are illustrated in FIG. 1. A host machine 125 can allocate a certain amount of its resources to individual virtual resources (e.g., virtual machine 115, container 111), and can multiplex the underlying hardware platform (e.g., infrastructure 123) of the host machine 125 among the virtual resources on the host machine 125. The host machine 125 can be a server computer system, a desktop computer or any other computing device.

A virtual machine 115 can be a software implementation of a machine (computer) that includes its own operating system (referred to as a guest operating system) and executes application programs (e.g., application 112). The software layer providing the virtualization in a virtual machine 225 is commonly referred to as a hypervisor 119, and is also known as a virtual machine monitor (VMM), a kernel-based hypervisor, or part of a host operating system 121. The hypervisor 119 can emulate the underlying hardware (e.g., infrastructure 123) of the host machine (e.g., host machine 125) to make use of the virtual machine 115.

A container can refer to an isolated set of resources allocated to executing an application (e.g., application 112) and/or process independent from other applications and/or processes. The application 112 in the container 111 can run under the host operating system 121. The host machine 125 can include a container engine 113 to create and manage the containers (e.g., container 111). In one implementation, the container 111 can run on a virtual machine 115 to provide an extra layer of separation between applications (e.g., application 112) running on a guest operating system of the virtual machine 115. In one implementation the virtual machine 115 can run in the container 111 to maintain isolation and security properties of virtual machines, while being able to package and distribute software as a container.

An application 112 can be any type of application including, for example, a web application, a desktop application, a browser application, etc. An application can be a messaging application, a video application, a social networking application, video sharing application, photo sharing application, chat application, mobile application of a content provider or any combination of such applications. An application can be a computationally large or data-intensive application, such as a forecasting application, a modeling application, a data analysis application, etc. An application can be a real-time application. The term "real-time" indicates that a transmission of a user communication from sender to receiver and/or receipt of the user communication by the receiver is made within a specified time constraint (e.g., under 50 microseconds).

The environment 150 can include a cluster management system 107 for automating deployment, scaling, and operations of applications across clusters of hosts in the environment 150. The cluster management system 107 can include one or more computing machines, such as a server computer system, a desktop computer or any other computing device. The computing machines of the cluster management system 107 can communicate to each other via network 105.

The host machine 125 can be coupled to one or more storage devices (e.g., storage device 103) via one or more networks (e.g., network 105). The network 105 can be a private network (e.g., a local area network (LAN), a wide area network (WAN), intranet, or other similar private networks) or a public network (e.g., the Internet). For brevity and simplicity, one storage device 103 is illustrated in FIG. 1. The storage device 103 can be any computing hardware that is used for storing, porting, and extracting data files and objects. The storage device 103 can store information both temporarily and permanently, and can be internal or external to a computer, server or any similar computing device. The storage device 103 can store data and can be shared between any number of virtual resources (e.g., container 111, virtual machine 115) in the environment 150. The storage device 103 can include a file system for organizing the data on the storage device 103.

A virtual machine 115 can access the storage device 103 via a device emulator 109. The device emulator 109 can emulate block devices (e.g., hard drives) for the virtual resource(s) (e.g., virtual machine 115, container 111) on the host machine 125, as described in greater detail below in conjunction with FIG. 2. The device emulator 109 can be a QEMU (short for Quick Emulator).

Traditionally, a container accesses a storage device by mounting the file system on the storage device via a mount point. Implementations of the present disclosure include a container I/O component 117 in the host operating system 121 to allow the container 111 to access the storage device 103 without mounting the file system on the storage device 103. The container I/O component 117 creates a data I/O path for the container 111 to access the storage device 103 via the device emulator 109. The data I/O path for the container 111 can include a communication interface between the container 111 and the container I/O component 117 of the host operating system 121, and a communication interface between the container I/O component 117 and the device emulator 109. The device emulator 109 can reside outside of the operating system. For example, when the container 111 attempts to access the data on the storage device 103, the container 111 can send an I/O request to the container I/O component 117. The container I/O component 117 can translate the I/O request in a format, which can be processed by the device emulator 109, and can send the translated I/O request to the device emulator 109. The device emulator 109 can perform a second translation of the I/O request, which is received from the container I/O component 117, into a format that the storage device 103 can process in order to create a response for the container 111. The translating of the I/O request of the container 111 is described in greater detail below in conjunction with FIG. 2 and FIG. 3.

Figure 2:
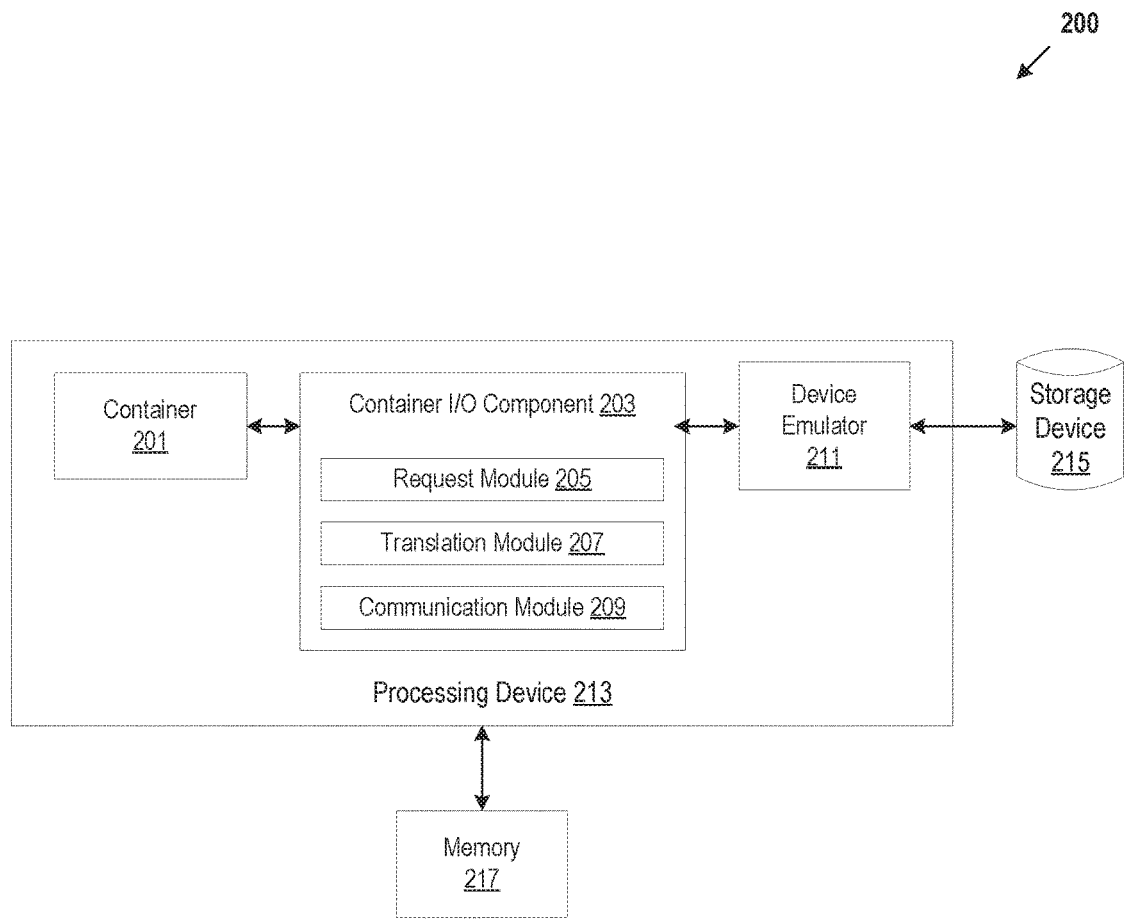
FIG. 2 depicts a high-level component diagram of one illustrative example of a storage management system for a container, in which systems and methods described herein may operate.

FIG. 2 depicts a high-level component diagram of one illustrative example of a storage management system 200 for a container, in which systems and methods described herein may operate. The storage management system 200 can include a processing device 213, memory 217, and one or more storage devices. For brevity and simplicity, one storage device 215 is illustrated in storage management system 200. The processing device 213 can be coupled to memory 217 including instructions to execute a container 201, a container I/O component 203, and a device emulator 211. The processing device 213 can include instructions to execute a request module 205, a translation module 207, and a communication module 209 of the container I/O component 203.

The container I/O component 203 can communicate with the container 201 and a device emulator 211 to create a data I/O path for the container 201 to access to one or more backend storage devices. For brevity and simplicity, one storage device 215 is illustrated in storage management system 200. The container I/O component 203 can be a component of an operating system being executed by the processing device 213. The container I/O component 203 can be a TCMU (Target Core Module in Userspace). The container I/O component 203 can include a request module 205, a translation module 207, and a communication module 209 for the container 201 to access the storage device 215.

The processing device 213 can reside on a computing machine (e.g., host machine) for hosting the container 201. When the container 201 is created, the container I/O component 203 can create local storage on the host machine for the container 201. The local storage that is created by the container I/O component 203 can be a pseudo device. Device nodes on the host machine do not have to correspond to physical devices. A pseudo device is a device node that lacks correspondence to a physical device. A pseudo device can provide various functions that are handled by the host operating system or a component (e.g., container I/O component 203) of the host operating system.

The pseudo device can be a block device. A block device is a computer data storage device that supports reading and (optionally) writing data in fixed-size blocks, sectors, or clusters. A block device can be referred to as a "drive". A block device can represent hardware, such as a disk drive (e.g., HDD (hard disk drive), SSD (solid state drive)), hard disk partitions, USB drives, and other devices.

The container I/O component 203 can create the pseudo device by specifying a path, which points to a particular device file in a directory of the host operating system, for the container 201 when the container 201 is being provisioned. For example, the container I/O component 203 can specify the path "/dev/sda," based on user input that is received when the container 201 is provisioned, to create the pseudo device for the container 201. The container I/O component 203 can receive user input from a user (e.g., system administrator). The "/dev" portion of the path can describe part of a directory tree of the operating system of the host machine that contains the "device" files for the host machine. The "sd" portion of the path can represent the block device to be used as the pseudo device. The character (e.g., "a") after the "sd" portion of the path can signify the order of the block device in which the block device can be found. For example, "a" can signify the first block device for the host machine.

The storage device 215 can include a file system (e.g., Network File System (NFS)) for organizing the data on the storage device 215. Traditionally, the container 201 would mount the file system on the storage device 215 via a mount point. Implementations of the present disclosure include the container I/O component 203 to assign the pseudo device to the container 201 to setup the container 201 to communicate to the pseudo device, rather than mounting the file system on the storage device 215 via a mount point. For example, the container I/O component 203 can specify the path for the pseudo device for the container 201 in configuration data of the container 201. The assignment of the pseudo device to the container 201 can prevent the container 201 from mounting, via a mount point, the file system on the storage device 215.

When the container 201 is requesting data on the storage device 215, the container 201 can open the pseudo device that is being simulated by the container I/O component 203, and send an I/O request (e.g., a block I/O call) to the pseudo device. The pseudo device is regarded by the container 201 as a block target device, and the I/O requests of the container 201 are set up to land on the block target device (e.g., pseudo device). The I/O requests (e.g., block I/O calls) are detected by the container I/O component 203.

The request module 205 of the container I/O component 203 can receive the block I/O call in a first format from the container 201. The first format can conform to a memory-mapped layout of the container I/O component 203. The container I/O component 203 can act as an in-kernel SCSI (Small Computer Systems Interface) target.

SCSI is a set of standards for physically connecting and transferring data between computers and peripheral device (e.g., hard disk drives). In computer data storage, a SCSI initiator is the endpoint that initiates a SCSI session, that is, sends a SCSI command. A SCSI target is the endpoint that does not initiate sessions, but instead waits for initiator's commands and provides required I/O data transfers.

The pseudo device can be a target. Instead of a physical storage device, the container I/O component 203 can implement a memory-mapped layout designed for SCSI commands. The SCSI commands can be expressed as an offset from the memory region's starting address. For example, when the container 201 attempts to access (e.g., read) data on the storage device 215, the container 201 can open the target device, which is the pseudo device that is defined as "/dev/sda", and send a block I/O call, such as, "read 100 bytes from sda from offset location 1000" to the pseudo device. The request module 205 can receive the block I/O call being sent by the container 201. The block I/O call is in the first format that conforms to the memory-mapped layout of designed for SCSI commands.

The device emulator 211 can emulate block devices (e.g., hard drives) for the virtual resource(s) (e.g., virtual machine, container) on a host machine. For example, when the container 201 is provisioned, the device emulator 211 can receive instructions, for example, from a cluster management system (e.g., cluster management system 107 in FIG. 1) to specify a block device (e.g., hard drive) to emulate for the container 201. The device emulator 211 can be a QEMU.

The device emulator 211 can specify a disk image or a local host device as the block device to emulate for the virtual resource. For the container 201, the device emulator 211 can specify the pseudo device, which is being simulated by the container I/O component 203, as the block device for the container 201.

The device emulator 211 can specify the block device for the virtual resource (e.g., container, virtual machine) by creating a file to emulate the local block device storage for the virtual resource. A QEMU block emulator uses "qcow2" (QEMU Copy On Write Version 2) file format for the file to emulate local block devices. For instance, when using a NFS server as a backend storage device 215, the device emulator 211 (e.g., QEMU) can create a qcow2 file on the NFS share to emulate a block device for a virtual resource. For example, the device emulator 211 can create a file using path of the pseudo device "/dev/sda" to emulate the pseudo device for the container 201.

The translation module 207 can translate the block I/O call from the first format into a device emulator call in a second format. The second format can be compatible with the device emulator 211. For example, the translation module 207 can translate the parameters "100 bytes from sda from offset location 1000" in the block I/O call to a function call that is in a format that conforms to the library of functions of the device emulator 211 (e.g., QEMU). For example, the translation module 207 can convert the block I/O call "read 100 bytes from sda from offset location 1000" to "QEMU_read_100."

The communication module 209 can send the device emulator call that is in the second format to the device emulator 211. For example, the communication module 209 can send the device emulator call "QEMU_read_100" to the device emulator 211. The device emulator 211 (e.g., QEMU) can perform a second translation to convert the "QEMU_read_100" to a backend storage device call, such as, "NFS_read_100," that is in a format which the storage device 215 can process. The storage device 215 can prepare a reply for the storage device call, and send the reply to the device emulator 211. The device emulator 211 can prepare a response based on the received reply, and can send the response to the communication module 209. The communication module 209 can receive, from the device emulator 211, the response, which includes the data on the storage device 215 for the container 201, as described in greater detail below in conjunction with FIG. 3.

Figure 3:
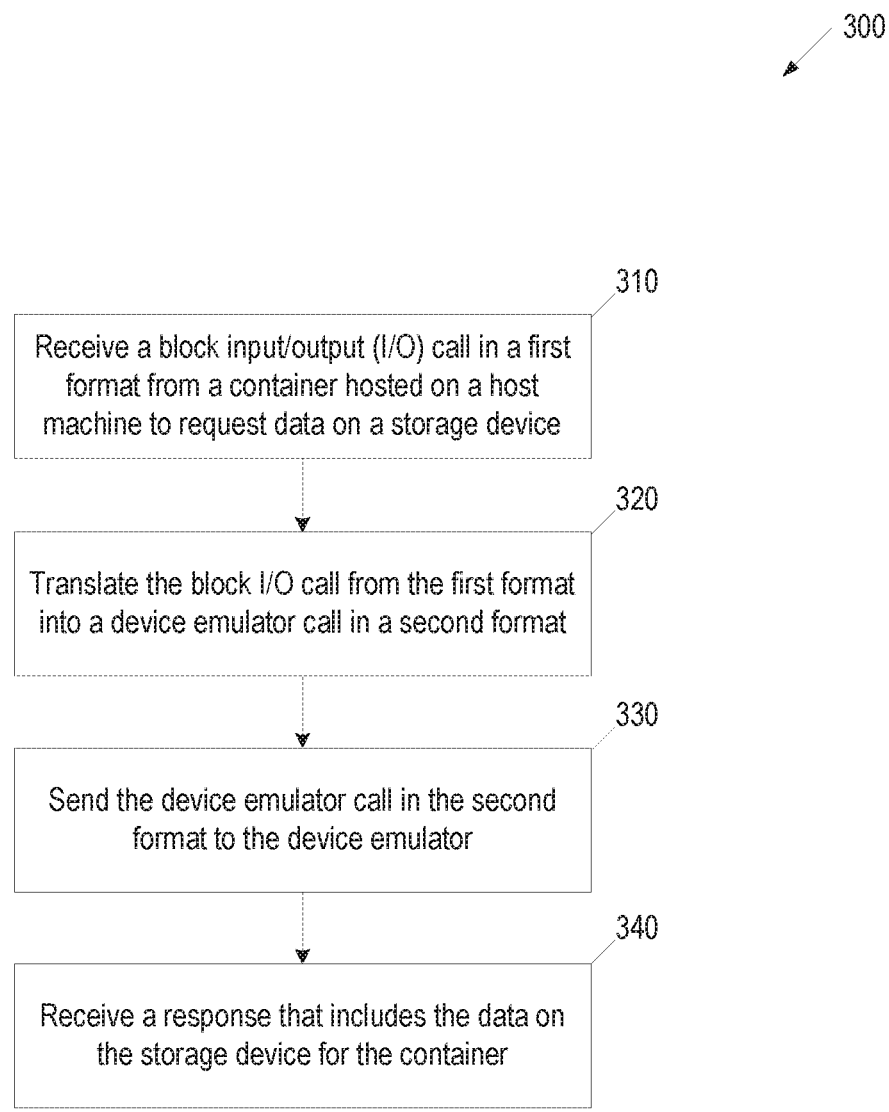
FIG. 3 is a flow diagram for a method for accessing data in a storage device by a container, in accordance with one or more implementations of the present disclosure.

FIG. 3 is a flow diagram for a method 300 for accessing data in a storage device by a container, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a container I/O component (e.g., container I/O component 203 of FIG. 2) executed by a processing device in a computing machine. At least a portion of method 300 can be performed automatically by the computing machine without user interaction.

At block 310, the processing device receives a block I/O call in a first format from a container hosted on a host machine to request data on a storage device. The processing device of the host machine can execute a container I/O component (e.g., container I/O component 203 of FIG. 2) as part of an operating system of the host machine for receiving block I/O calls from a container, and for responding to the block I/O calls. The container I/O component can be a TCMU in the operating system. The first format can conform to a memory-mapped layout of the container I/O component.

At block 320, the processing device translates the block I/O call from the first format into a device emulator call in a second format. The second format is compatible with and can be understood by a device emulator on the host machine. The device emulator can emulate a block device for the container. The device emulator can be a QEMU. The second format can be defined by the library of functions for the device emulator (e.g., QEMU). The processing device can have access to the library of the device emulator and can identify which function in the library corresponds to the function in the block I/O call that is received from the container. The processing device can convert the block I/O call to a device emulator call in the second format using the identified function in the device emulator's library.

At block 330, the processing device sends the device emulator call in the second format to the device emulator. The device emulator translates the device emulator call into a storage device call, which the storage device can process, and then sends the storage device call to the storage device. At block 340, the processing device receives, from the device emulator, a response that includes the data on the storage device for the container.

For example, when the container attempts to read data on the storage device, the container can open the pseudo device, for example, defined as "/dev/sda", and send a block I/O call, such as, "read 100 bytes from sda from location 1000" to the container I/O component. The container I/O component can convert the block I/O call "read 100 bytes from sda from offset location 1000" to "QEMU_read_100," which is in a second format that conforms to the library of functions of the device emulator.

For example, the device emulator translates the device emulator call "QEMU_read_100" to a backend storage device call, such as, "NFS_read_100". The device emulator (e.g., QEMU) can access the library of functions of the storage device, translate the device emulator call into a storage device function call, and send the storage device function call (e.g., "NFS_read_100") to the storage device.

In response, the storage device processes the storage device function call (e.g., "NFS_read_100"), for example, by retrieving the requested data, and creating a data buffer that contains the requested data. The device emulator has already created a file (e.g., hypervisor-encoded file) on the storage device for emulating a block device for the container using the path "/dev/sda" of the pseudo device for container. The storage device can process the storage device call (e.g., "NFS_read_100") using the hypervisor-encoded file that emulates the block device for the container. The requested data is stored in the hypervisor-encoded file. The storage device can send the data buffer, which contains the requested data, in a first response to the device emulator (e.g., QEMU). The device emulator can create and send a second response, which contains the requested data from the hypervisor-encoded file and is in a format that can be processed by the container I/o component, to the container I/O component.

Unlike traditional container solutions that mount a file system via a mount point and give the container access to the entire contents of the file system on a storage device, the processing device of method 300 executes the container I/O component to communicate with the device emulator, rather than mounting the file system, to limit access of the container to a portion of the storage device. The portion can correspond to the block storage device being emulated by the device emulator for the container.

In one implementation, the container can be a first virtual resource hosted on the host machine, and the storage device can be shared between the container and a second virtual resource. The second virtual resource can be another container, a virtual machine, another container within a virtual machine, or a virtual machine within another container. The second virtual resource can be hosted on the host machine or hosted on another host machine. The access to the storage device by the container and the second virtual resource can be limited to access via the device emulator on the host machine. The container is setup to communicate I/O requests to the container I/O component on the operating system, rather than sending I/O requests directly to the storage device via a mount point on the storage device. Then, the container I/O component communicates, on behalf of the container, a request to the device emulator. In one example, the second virtual resource is a second container that is also setup to communicate I/O requests to the container I/O component, and the container I/O component communicates, on behalf of the second container, a request to the device emulator. In another example, the second virtual resource may be a virtual machine that is setup to send I/O requests directly to the device emulator.

Figure 4:
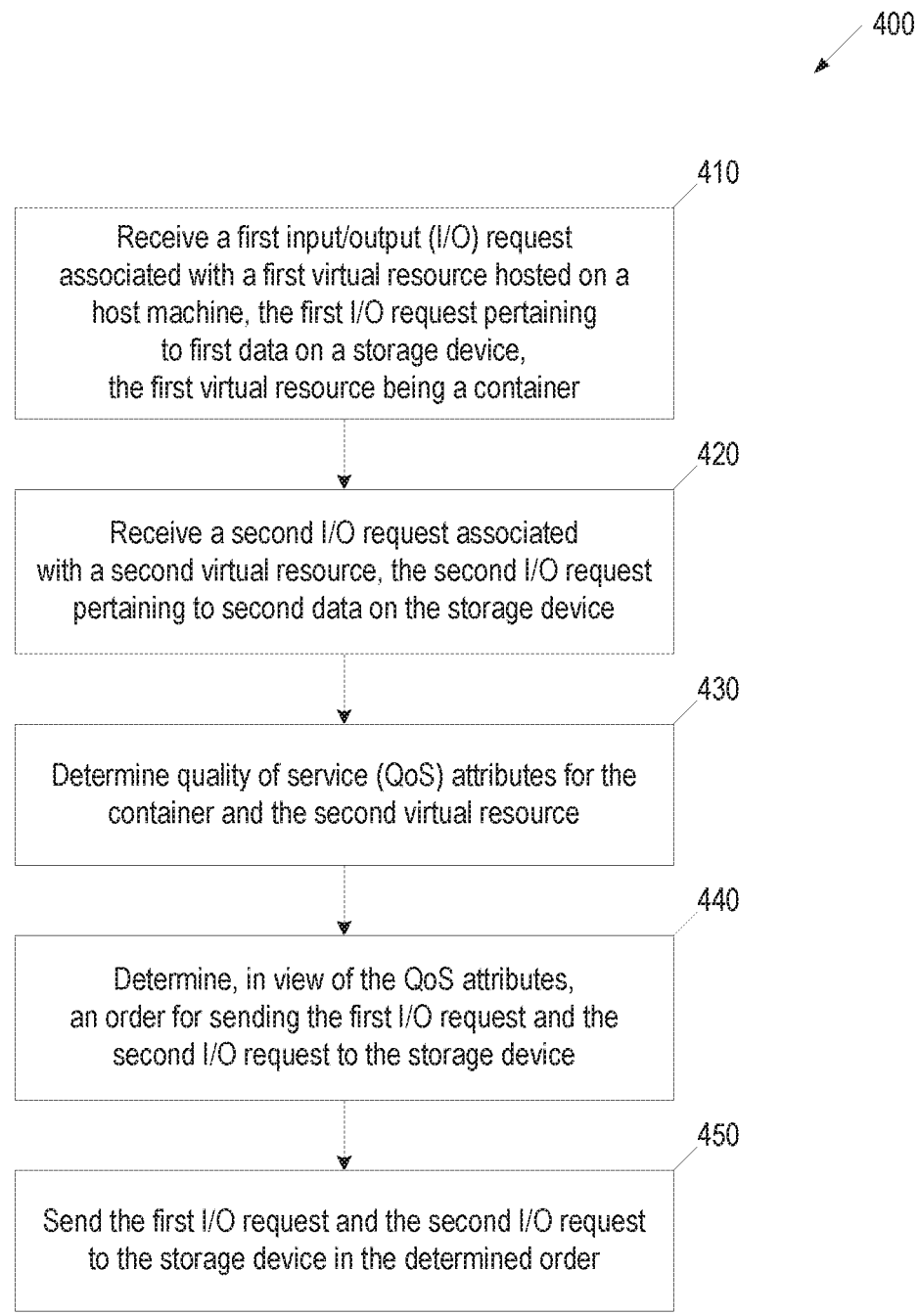
FIG. 4 is a flow diagram for a method for managing quality of service (QoS) of a container, in accordance with one or more implementations of the present disclosure.

FIG. 4 is a flow diagram is a flow diagram for a method 400 for managing I/O requests of a container using QoS attributes of the container, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a device emulator (e.g., device emulator 211 of FIG. 2) executed by a processing device in a computing machine. At least a portion of method 400 can be performed automatically by the computing machine without user interaction.

At block 410, the processing device receives a first input/output (I/O) request associated with a first virtual resource hosted on a host machine. The processing device can be on a host machine that hosts the first virtual resource. The first virtual resource can be a container, which does not reside within a virtual machine. The processing device can be executing a device emulator to emulate a block device for the container, and the device emulator can receive the first I/O request from an operating system component (e.g., container I/O component 203 in FIG. 2) of the host machine. The first I/O request pertains to first data on a storage device.

At block 420, the processing device receives a second I/O request associated with a second virtual resource. The second I/O request pertains to second data on the storage device. The storage device can be shared between the container and the second virtual resource. The second virtual resource can be another container, a virtual machine, another container in a virtual machine, or a virtual machine within another container. The second virtual resource can be hosted on the host machine.

At block 430, the processing device determines QoS attributes for the container and the second virtual resource. The QoS attributes can include, for example, a measurement of I/O bandwidth for a virtual resource (e.g., container, second virtual resource), a priority level assigned to the virtual resource, and a time that the processing device receives the I/O request of a virtual resource. The measurement for the I/O bandwidth can be represented as a number of I/O events (e.g., I/O read requests, I/O write requests) for a particular virtual resource for a period of time. The period of time can be configurable and/or user-defined. The period of time can be stored as part of configuration data. The processing device can determine the first I/O bandwidth for the container by counting the number of I/O events associated with the container during the period of time. The processing device can associate each I/O request with a block device that is being emulated for a virtual resource. For example, the processing device can determine, from identifiers in the I/O requests, which I/O requests are associated with the pseudo device being emulated for the container, and which I/O requests are associated with the block device being emulated for the second virtual resource. The processing device can count the number of I/O requests that occur for a particular time interval (e.g., one second) to determine the I/O bandwidth for a respective virtual resource. For example, the processing device may count 10 I/O requests per second for the container.

The virtual resources can be assigned a respective priority level. A virtual resource may be assigned a priority based on, for example, the end-user(s) and/or end-user group(s) that are using the virtual resource, the application(s) being executed by the virtual resource, the jobs being performed by the virtual resource, etc. A cluster management system (e.g., cluster management system 107 in FIG. 1) can set the priorities for the various virtual resources, for example, based on user input, and can store the priorities in configuration data. The processing device can access the priorities and determine which virtual resource has a higher priority. For example, the container may be used by an end-user group that is developing an application for a company, and the second virtual resource may be backup source of data for the company. The cluster management system can set, based on user input from a system administrator of the company, the priority for the container to a higher priority than the priority for the second virtual resource.

The processing device can compare one or more QoS attributes for the virtual resources (e.g., the container and the second virtual resource), for example, to determine which I/O request (e.g., first I/O request or second I/O request) to send to the storage device first.

At block 440, the processing device determines, in view of the QoS attributes, an order for sending the first I/O request and the second I/O request to the storage device. The processing device can make a determination of which I/O request to place first in the order for being sent to the storage device based on the I/O bandwidths and/or the priority levels of the virtual resources.

In one example, the processing device can determine whether the I/O bandwidths for the virtual resources (e.g., the container and the second virtual resource) exceed a limit that is assigned to the respective virtual resource. The limit can be a throttling I/O rate. The virtual resources can be assigned throttling I/O rates as limits to control the number of I/O events per the period of time for the respective virtual resource. The throttling I/O rate can be represented as a number of I/O events per a period of time. The throttling I/O rate can be configurable and/or user-defined, and can be assigned to the block device that is being emulated by the device emulator for the particular virtual resource. A cluster management system (e.g., cluster management system 107 in FIG. 1) and/or a device emulator (e.g., device emulator 109 in FIG. 1) can set the throttling I/O rates, for example, based on user input, and assign the throttling I/O rates to the respective virtual resources.

If one of the I/O bandwidths for the virtual resources does not exceed its respective limit, and the other I/O bandwidth for the other virtual resource exceeds its respective limit, the processing device can place the I/O request that corresponds to the virtual resource that does not exceed its respective limit in a position in the order to be sent to the storage device before the other I/O request. The processing device can prevent the other I/O request from being sent to the storage device by placing the other I/O request in a queue until a time when sending the other I/O request to the storage device would not cause its corresponding virtual resource to exceed its respective limit. For example, the processing device may determine that the first I/O bandwidth for the container does not exceed a limit and that the second I/O bandwidth for the second virtual resource exceeds its limit, may place the first I/O request in a first position in the order, and may place the second I/O request associated with the second virtual resource in a second position in the order.

The processing device can assign queues to the block devices that are being emulated for the virtual resources (e.g., the container, the second virtual resource). The queues can be used to store I/O requests (e.g., first I/O request, second I/O request) to prevent an I/O request from being sent to the storage device.

If the I/O bandwidths for the virtual resources do not exceed the respective limits, the processing device can determine the order in which the I/O requests are to be sent to the storage device based on the priority levels of the virtual resources. The processing device can create the order such that the send I/O request associated with the virtual resource that has a higher priority is to be sent to the storage device first. For example, the processing device may determine that both the first I/O bandwidth for the container and the second I/O bandwidth for the second virtual resource do not exceed the respective limits. The processing device may then determine that the first priority level for the container has a higher priority than the second priority level for the second virtual resource, and can create an order such that first I/O request associated with the container is sent to the storage device before the second I/O request associated with the second virtual resource.

If the I/O bandwidths for the virtual resources exceed the respective limits, the processing device can prevent the I/O requests from being sent to the storage device until a time when sending a respective I/O request to the storage device would not cause the corresponding virtual resource to exceed the respective limit. The processing device can store the I/O requests in the respective queues and remove the I/O requests from the respective queues based on the priority levels of the virtual resources. For example, the processing device may determine that both the first I/O bandwidth for the container and the second I/O bandwidth for the second virtual resource exceed the respective limits. The processing device can store the first I/O request in the queue that is assigned to the block device (e.g., pseudo device) that is being emulated for the container and can store the second I/O request in the queue that is assigned to the block device that is being emulated for the second virtual resource.

The processing device may then determine that the first priority level for the container has a higher priority than the second priority level for the second virtual resource, and can first remove the first I/O request in the queue for the container and send the first I/O request to the storage device, prior to removing the second I/O request in the queue for the second virtual resource. At block 450, the processing device sends the first I/O request and the second I/O request to the storage device in the determined order.

Figure 5:
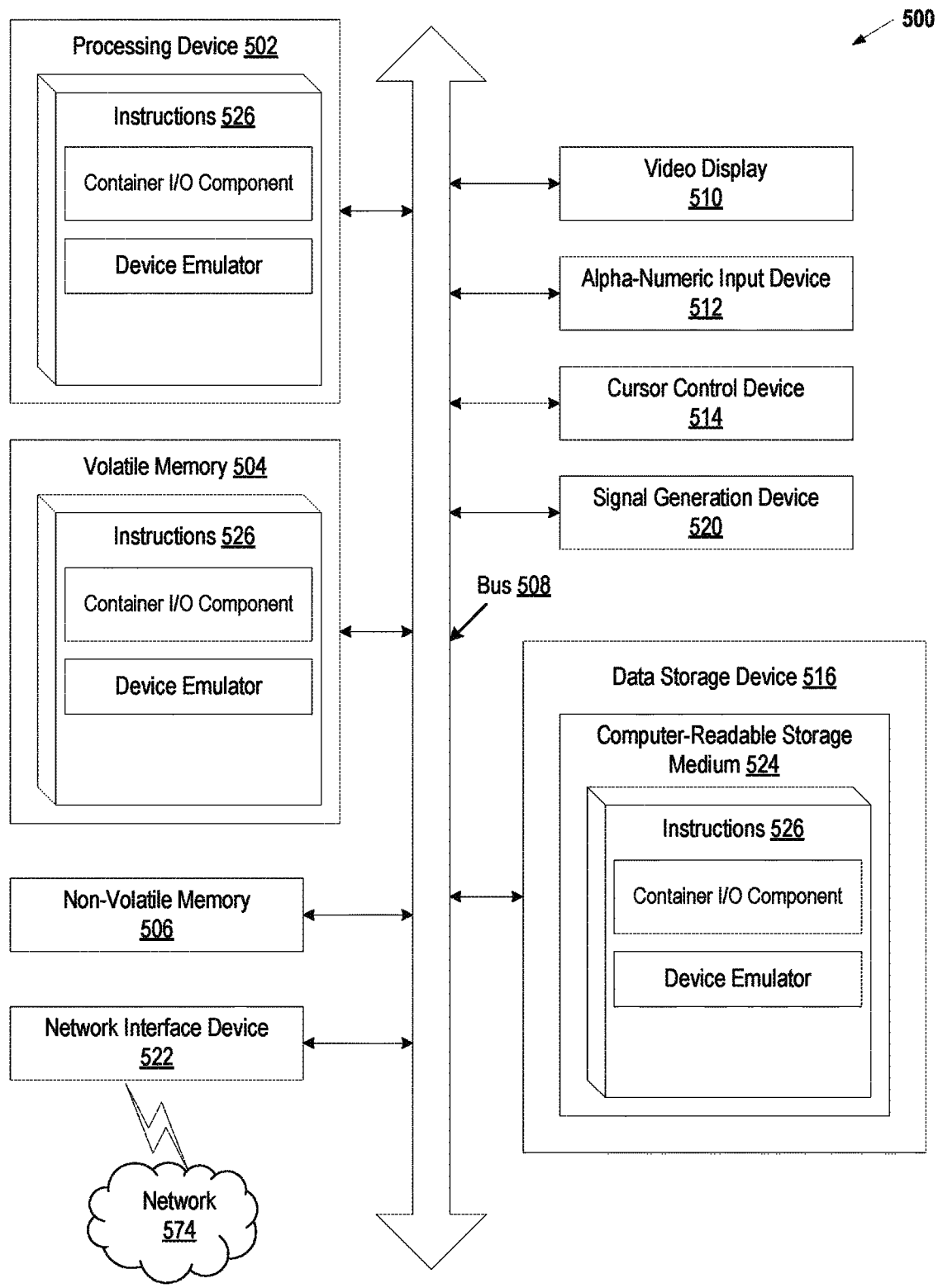
FIG. 5 is a block diagram of an example computer system that may perform one or more of the operations described herein.

FIG. 5 depicts a block diagram of a computer system 500 operating in accordance with one or more aspects of the present disclosure. In various illustrative examples, computer system 500 may correspond to a computing device within system architecture 100 or storage management system 200 of FIG. 1 and FIG. 2 respectively. The computer system 500 may be included within a data center that supports virtualization. Virtualization within a data center results in a physical system being virtualized using virtual machines and/or containers to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. A container may be an isolated set of resources allocated to executing an application and/or process independent from other applications and/or processes. This type of virtualization results in multiple VMs and/or containers sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding container I/O component 117 and/or device emulator 109 of FIG. 1 for implementing methods 300 or 400.

Instructions 526 may also reside, completely or partially, within volatile memory 504 and/or within processing device 502 during execution thereof by computer system 500, hence, volatile memory 504 and processing device 502 may also constitute computer-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "translating," "sending," "limiting," "determining," "preventing," "assigning," "storing," "emulating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and method 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving a block input/output (I/O) call in a first format from a container hosted on a host machine to request data on a storage device;
translating, by a processing device of the host machine, the block I/O call from the first format into a device emulator call in a second format, the second format being compatible with a device emulator on the host machine, wherein the device emulator emulates a block storage device for the container;
sending the device emulator call in the second format to the device emulator; and
receiving, from the device emulator, a response comprising the data on the storage device for the container.

2. The method of claim 1, wherein a component of an operating system of the host machine receives the block I/O call, translates the block I/O call into the device emulator call, sends the device emulator call from the operating system to the device emulator, and receives the response from the device emulator.

3. The method of claim 2, wherein the first format conforms to a memory-mapped layout of the component.

4. The method of claim 1, wherein the container is a first virtual resource hosted on the host machine, and the storage device is being shared between the container and a second virtual resource, the second virtual resource being at least one of another container or a virtual machine.

5. The method of claim 4, wherein the second virtual resource is hosted on the host machine or hosted on another host machine.

6. The method of claim 1, wherein access to the storage device by the container and the second virtual resource is limited via the device emulator.

7. The method of claim 1, wherein the data is stored in a hypervisor-encoded file.

8. The method of claim 1, further comprising:
limiting access of the container to a portion of the storage device, the portion corresponding to the block storage device being emulated for the container by the device emulator.

9. A system comprising:
a memory; and
a processing device coupled to the memory, the processing device to:
receive a block input/output (I/O) call in a first format from a container hosted on a host machine to request data on a storage device;
translate the block I/O call from the first format into a device emulator call in a second format, the second format being compatible with a device emulator on the host machine, wherein the device emulator emulates a block storage device for the container;
send the device emulator call in the second format to the device emulator; and
receive, from the device emulator, a response comprising the data on the storage device for the container.

10. The system of claim 9, wherein a component of an operating system being executed by the processing device is to receive the block I/O call, translate the block I/O call from the first format into the device emulator call, send the device emulator call from to the device emulator, and receive the response from the device emulator.

11. The system of claim 10, wherein the first format conforms to a memory-mapped layout of the component.

12. A non-transitory computer-readable storage medium including instructions that, when executed by a processing device, cause the processing device to:
receive a first input/output (I/O) request associated with a first virtual resource hosted on a host machine, the first I/O request pertaining to first data on a storage device, the first virtual resource being a container;
receive a second I/O request associated with a second virtual resource, the second I/O request pertaining to second data on the storage device, the storage device being shared between the container and the second virtual resource, the second virtual resource being at least one of another container or a virtual machine;
determine a plurality of quality of service (QoS) attributes for the container and the second virtual resource;
determine, in view of the plurality of QoS attributes, an order for sending the first I/O request and the second I/O request to the storage device; and
send the first I/O request and the second I/O request to the storage device in the determined order.

13. The non-transitory computer-readable storage medium of claim 12, wherein to send the first I/O request and the second I/O request to the storage device in the determined order, the processing device is to:
assign a queue to a block device that is being emulated for the second virtual resource;
prevent the second I/O request from being sent to the storage device by storing the second I/O request in the queue;
send the first I/O request to the storage device;
remove the second I/O request from the queue; and
send the second I/O request to the storage device.

14. The non-transitory computer-readable storage medium of claim 12, wherein to send the first I/O request and the second I/O request to the storage device in the determined order, the processing device is to:
assign a queue to a block device that is being emulated for the container;
prevent the first I/O request from being sent to the storage device by storing the first I/O request in the queue;
send the second I/O request to the storage device;
remove the first I/O request from the queue; and
send the send I/O request to the storage device.

15. The non-transitory computer-readable storage medium of claim 12, wherein the plurality of QoS attributes comprises a first I/O bandwidth for the container and a second I/O bandwidth for the second virtual resource.

16. The non-transitory computer-readable storage medium of claim 14, wherein the plurality of QoS attributes further comprises a first priority level for the container and a second priority level for the second virtual resource.

17. The non-transitory computer-readable storage medium of claim 15, wherein prior to sending the first I/O request to the storage device, the processing device is to:
determine that the first I/O bandwidth for the container does not exceed a limit and that the second priority level for the second virtual resource has a lower priority than the first priority level for the container, wherein the limit is a throttling I/O rate that is assigned to a block device being emulated for the container, and wherein the throttling I/O rate controls a number of I/O events of the container per a period of time.

18. The non-transitory computer-readable storage medium of claim 15, wherein prior to sending the second I/O request to the storage device, the processing device is to:
determine that the first I/O bandwidth for the container exceeds a limit or that the second priority level for the second virtual resource has a higher priority than the first priority level for the container, wherein the limit is a throttling I/O rate that is assigned to a block device being emulated for the container, and wherein the throttling I/O rate controls a number of I/O events of the container per a period of time.

19. The non-transitory computer-readable storage medium of claim 12, wherein the storage device comprises a file system, and the processing device is further to:
prevent the container from mounting the file system via a mount point.

20. The non-transitory computer-readable storage medium of claim 19, wherein to prevent the container from mounting the file system, the processing device is to:
emulate a block device for the container using a pseudo device that is created on the host machine for the container.

* * * * *